July 29, 1958  S. L. KILE ET AL  2,845,228
CONTROL APPARATUS FOR FLUID FUEL BURNING APPARATUS
Filed Oct. 13, 1953  3 Sheets-Sheet 1

INVENTORS:
Stephen L. Kile
Russell B. Matthews

By: Attys.

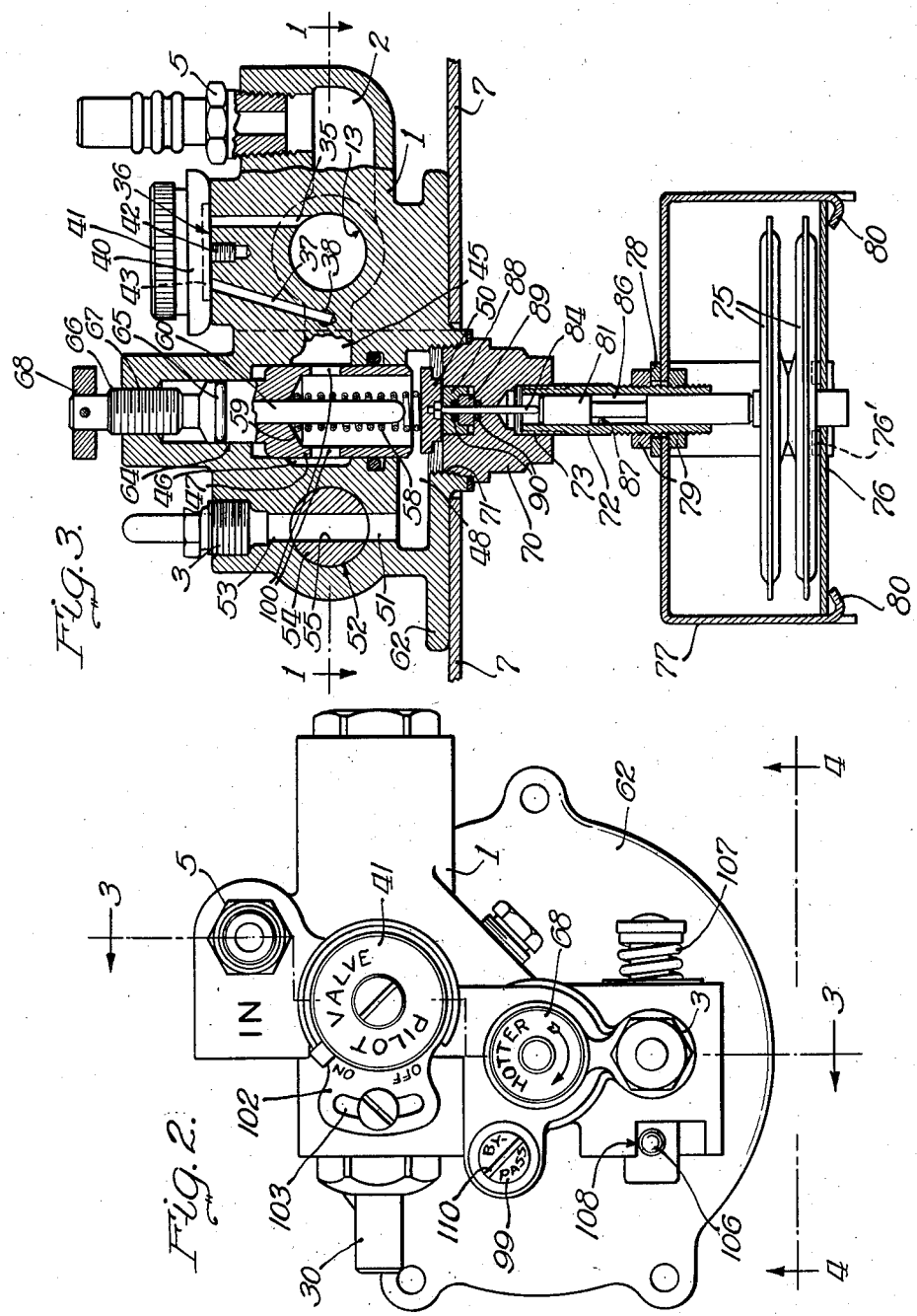

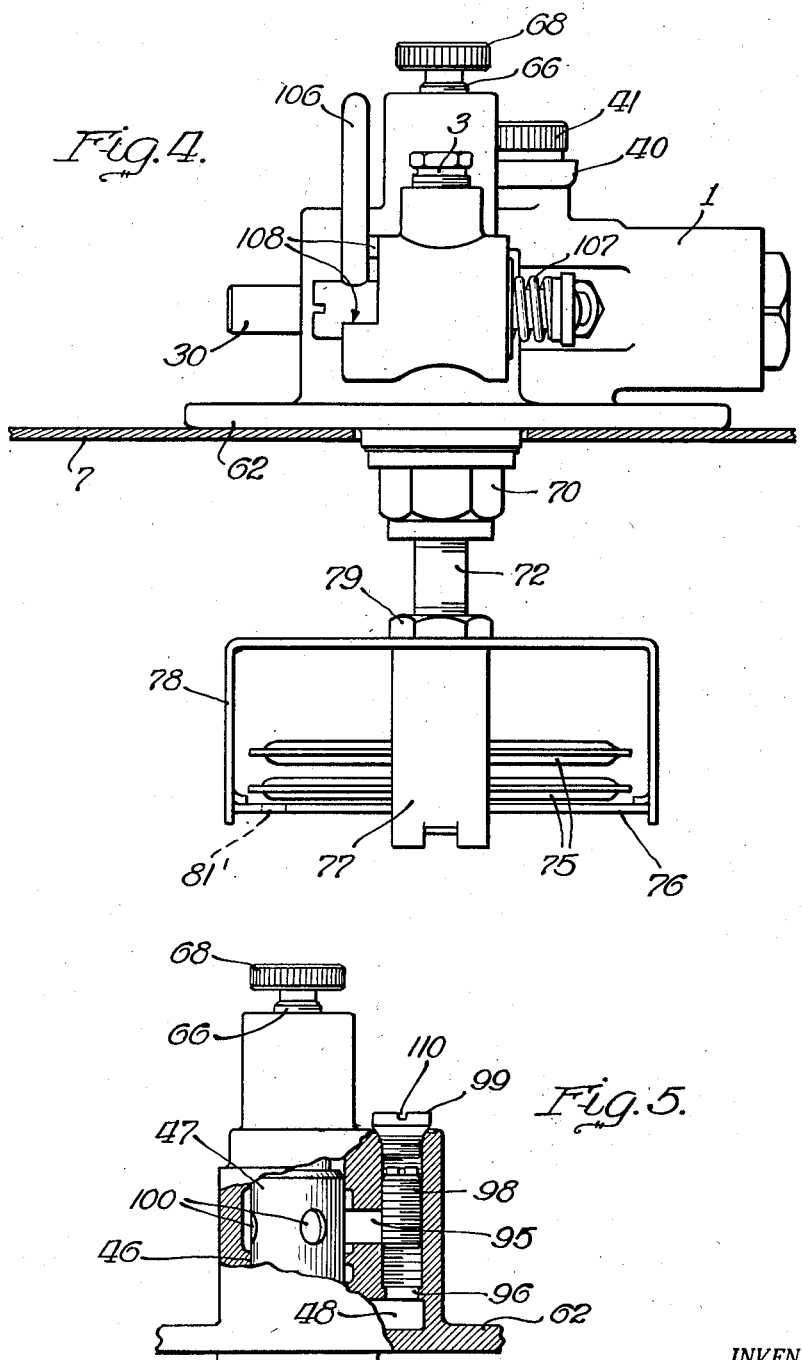

United States Patent Office 2,845,228
Patented July 29, 1958

2,845,228

CONTROL APPARATUS FOR FLUID FUEL BURNING APPARATUS

Stephen L. Kile, Whitefish Bay, and Russell B. Matthews, Wauwatosa, Wis., assignors to Baso Inc., Milwaukee, Wis., a corporation of Wisconsin Application October 13, 1953, Serial No. 385,828

2 Claims. (Cl. 236—99)

This invention relates, in general, to control apparatus, and has particular relation to an improved control apparatus for controlling the flow of fluids such as the flow of fluid fuel for fluid fuel burning apparatus and the like.

One of the main objects of the invention is to provide an improved form of control apparatus which has particular utility in controlling, for example, the flow of fluid fuel for fluid fuel burning apparatus for brooders and the like, it being understood, however, that the present invention is not, in its broader aspects, limited to control apparatus of the particular character selected for illustration or for the particular use set forth.

Another object is to provide an improved control device of the aforementioned character for controlling flow of fuel for fluid fuel burning apparatus in which the flow of fuel is modulated in accordance with changes in a condition, but in which means are provided for maintaining a minimum flow of fuel consistent with safe stable flame at the burner.

Another object is to provide an improved control device which has (1) safety shut-off means which is held, for example, in flow permitting position by energization of an electromagnet by a source of small electric energy such as a thermocouple or thermopile heated by a flame at the fluid fuel burning apparatus and operates to flow preventing position to provide 100 percent shut-off of the fuel supply to the fluid fuel burning apparatus upon extinguishment of the flame, and (2) a condition, and more particularly, a temperature responsive control of the aforementioned character, for controlling the flow of fuel to the fluid fuel burning apparatus.

Another object is to provide an improved control device of the character set forth which has (1) temperature responsive means for disposition within the brooder receptacle so that it will be at all times responsive to the temperature therein, and (2) temperature adjusting means for disposition outside the brooder receptacle so that it will be at all times conveniently accessible for adjusting the temperature for which the device is set. The disposition of the temperature adjusting means outside the brooder receptacle is further advantageous in that the device thereby cannot be thrown out of adjustment by the chicks or other fowl within the brooder and the temperature adjusting means cannot be clogged or rendered unclean, for example, by excreta or excrement, feed or the like, and does not require opening of a door for access thereto which is awkward and permits cold air to enter the brooder.

Another object is to provide an improved control device of the character set forth in which the temperature adjustment is obtained by moving a valve seat relative to a cooperating valve disc part, and more particularly, a device in which there is combined with the temperature adjustment, obtained by the aforementioned movement of a valve seat, a temperature responsive control obtained by movement of the cooperating valve disc part relative to the valve seat. This is advantageous since it permits temperature responsive control from one end which may, for example, be disposed within the brooder and temperature adjustment from the other end which may, for example, be disposed outside the brooder.

Another object is to provide an improved control device of the character set forth in which there is a by-pass around the temperature responsive modulating control valve which assures at all times at least a small flow of fuel for maintaining a safe minimum burner flame, the temperature responsive control being effective when there is a call for heat to increase the flow of fuel and thereby provide a higher flame at the burner.

Another object is to provide a control device of the character set forth in which the safety shut-off means and pilot burner outlet are upstream or on the fuel inlet side of the temperature responsive control and in which more particularly there is a manual gas cock on the downstream or fuel outlet side of the temperature responsive control for control of gas flow to the main burner independent of that of the pilot burner whereby, heating of the brooder may, if desired, be accomplished by burning of fuel at the pilot burner only, but wherein the entire control is nevertheless maintained subject to the safety shut-off means aforementioned.

Another object is to provide a control device of the character set forth in which the by-pass for assuring at all times at least a safe minimum burner flame is afforded by a plurality of by-pass ports in the valve seat assembly and in which these ports are arranged to assure the desired by-pass flow of fuel at all times regardless of the setting of the temperature adjustment.

Another object is to provide an improved control device of the character set forth which is adapted for easy application as a unitary structure, for example, to a brooder or the like, and in which the parts of the device are in novel relation and coact in novel manner.

Another object is to provide an improved form of temperature responsive control utilizing a bellows containing a temperature responsive fill and which coacts with the cooperating valve disc part within the valve body to provide the desired temperature responsive control, the bellows being external to the body and having detachable connection therewith for quick and easy repair or replacement by the user.

Another object is to provide cocking or reset means for the safety shut-off valve which includes a flow interrupter valve for interrupting the flow of fuel to the main burner during the cocking operation, a by-pass for by-passing fuel around the flow interrupter valve to an ignition burner, and, an ignition burner adjustment valve in said by-pass for controlling flow of fuel to the ignition burner.

Another object is to provide improved valve means, for example, for controlling flow of fuel to a main burner which functions to provide a modulating control by governing the fuel flow in a manner which is directly and continuously in accordance with the condition sought to be controlled, but nevertheless providing for safe minimum flow to the burner consistent with safe operation.

Further objects and advantages and numerous adaptations of the invention will appear from the following detailed description taken in connection with the accompanying drawings showing one embodiment of the invention, it being understood that the invention is limited only within the scope of the appended claims and not to the particular embodiment selected for illustration.

In the drawings:

Figure 1 is a sectional view through a control device embodying the present invention taken on the line 1—1 of Figure 3 and showing the device applied to the wall of a brooder or similar receptacle and also showing more or less schematically a main burner provided with an ignition burner and a thermoelectric generator positioned to be heated by a flame of the ignition burner and connected in circuit with the electromagnetic means for the safety shut-off valve;

Figure 2 is an elevational view of the outer side of the control device;

Figure 3 is a sectional view taken on the line 3—3 of Figure 2;

Figure 4 is an elevational view of the control device looking in the direction of the arrows 4—4 in Figure 2; and Figure 5 is a detail sectional view partially in elevation taken on the line 5—5 of Figure 1.

Figure 1:
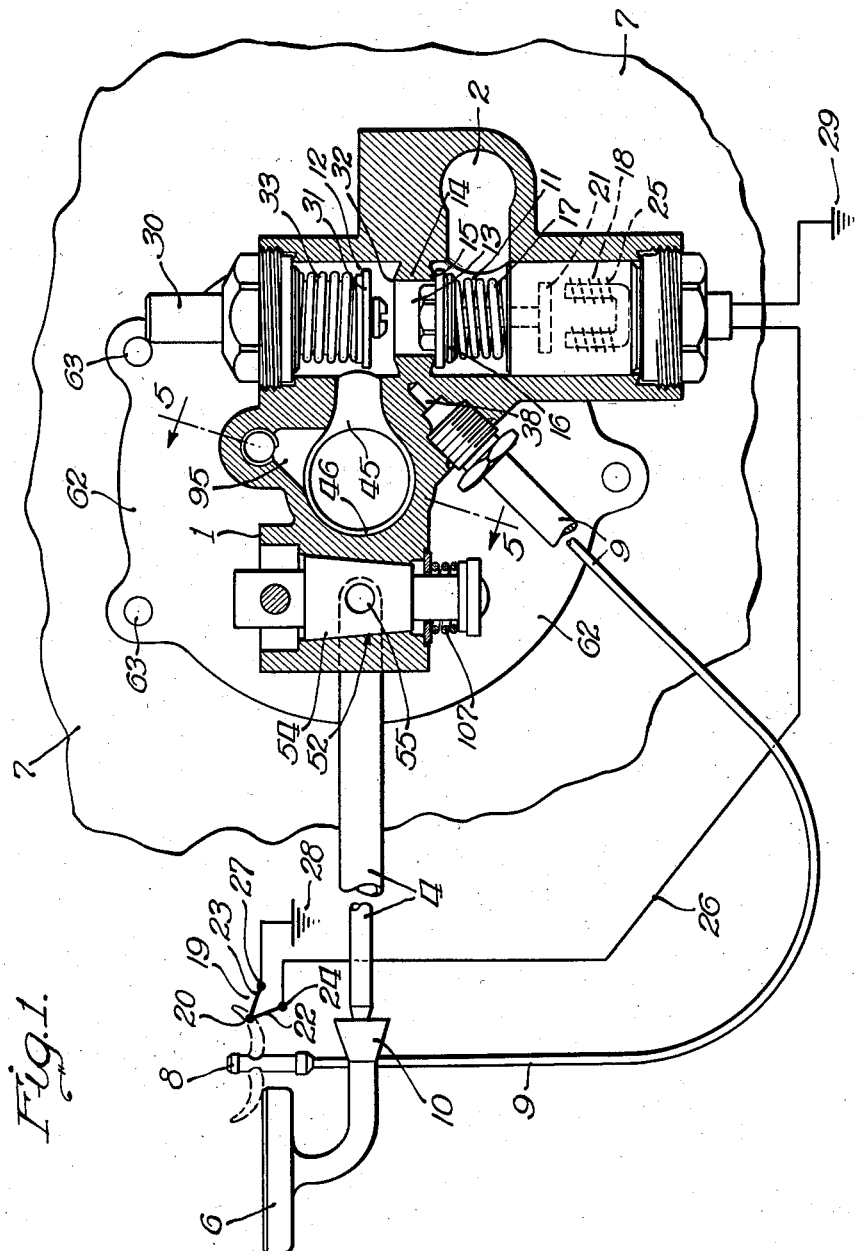

In the drawings, the numeral 1 designates a valve body having a gaseous fuel inlet 2 and a gaseous fuel outlet 3. Contiguous sections of a gaseous fuel supply pipe 4 are connected to the inlet 2 and outlet 3, for example, by adapters, one of which is shown at 5 in Figure 3.

The section of the pipe 4 connected to the outlet 3 leads to a main burner 6 (Figure 1) which may be located within the brooder or similar receptacle. The wall of the brooder or other receptacle is indicated fragmentarily at 7. An ignition burner 8 is located in juxtaposition to the main burner 6 to maintain an ignition or pilot burner flame for igniting the main burner. The ignition burner 8 is supplied with gaseous fuel by an ignition burner fuel supply pipe 9 which may be connected, for example, to the valve body 1 as will presently be described. The positions of the ignition burner flames are shown in dotted lines in Figure 1.

The delivery of gaseous fuel from the pipe 4 to the burner 6 is preferably by way of a mixing chamber 10 to which air is admitted through adjustable air inlets (not shown) as well understood in the art.

As shown particularly in Figure 1, the inlet 2 opens into a chamber 11 which chamber opens, when a safety shut-off valve and a flow interrupter valve, to be presently described, are open, into a chamber 12 through a connecting port 13 in a wall 14. At one end of the port 13, the wall 14 has an annular valve seat 15 against which a safety shut-off valve 16 is biased by a spring 17. The shut-off valve 16 has electromagnetic means 18 connected in circuit with a thermoelectric generator 19 (shown in the form of a thermocouple) and adapted when energized by the heat of the ignition burner flame on the "hot" junction 20 of the thermocouple to hold an armature 21 connected to the valve 16 in attracted position and thereby the shut-off valve 16 in open position. The shut-off valve 16 and its electromagnetic means 18 may be of the form shown and described, for example, in Oscar J. Leins Patent No. 2,126,564, patented August 9, 1938.

The thermocouple 19 comprises dissimilar thermocouple elements 22 and 23 joined to form at 20 the "hot" junction which is positioned to be heated by the ignition burner flame. The "cold" junction 24 of the thermocouple 19 may be connected in circuit with one end of the coil 25 of the electromagnetic means 18 for the shut-off valve 16, for example, by a conductor 26 with the other "cold" junction 27 grounded at 28 and the other end of the coil 25 grounded at 29. The thermocouple 19 and lead conductors therefor may be of concentric form as shown and described in the aforementioned patent of Oscar J. Leins.

Where the relatively small electric energy provided by the heat of the ignition burner flame on the thermocouple, while capable of holding the shut-off valve 16 open, is incapable of energizing the electromagnetic means 18 sufficiently to open this valve, cocking or reset means including a cocking or reset button 30 may be provided for cocking or resetting the shut-off valve 16 to open position and its connected armature 21 to attracted position. The cocking means is shown as including a flow interrupter valve 31 which seats against an annular valve seat 32 at the opposite end of the port 13 to interrupt the flow of fuel to the main burner 6 during the cocking operation. The cocking means and its flow interrupter valve 31, which has a spring 33 for seating the valve 31 against its seat 32 when the button 30 is depressed, may be of the form shown and described, for example, in Charles V. Hildebrecht Patent No. 2,114,446, patented April 19, 1938.

An ignition burner fuel supply passageway 35 opens from the port 13 between the valve seats 15 and 32 to the surface 36 of the valve body 1 and a second ignition burner fuel supply passageway 37 opens from the surface 36 to an ignition burner fuel outlet 38 (Figure 1) which is connected to the ignition burner fuel supply pipe 9 for supplying fuel to the ignition burner 8. The passageways 35 and 37 are adapted to by-pass fuel to the ignition burner around the flow interrupter valve 31 when it is closed, but at the same time the shut-off valve 16 when closed shuts off the supply of fuel both for the main burner and for the ignition burner to provide 100 percent safety shut-off.

If desired, there may be an ignition burner valve, for example, in the form of a disc valve 40 seated against the surface 36. This disc valve 40 has a knob or fingerpiece 41 for turning it about the axis of the pin 42 and an arcuate port shown in dotted lines at 43 (Figure 3) which is turned by the knob 41 to place the passageways 35 and 37 in full communication as well as to shut off or vary the amount of communication between these passageways. The ignition burner supply of fuel may thereby be turned on, shut off or varied as desired.

The chamber 12 opens at 45 into a cylindrical bore 46 in which is mounted a valve seat assembly which includes a valve seat member 47 having at one end a tubular part with the interior thereof adapted to open into a chamber 48. A valve disc member 50 has flow controlling cooperation with the open end of the valve seat member 47 to control the flow of fuel into the chamber 48 and thereby to the main burner, as will presently appear. The flow controlling cooperation between the valve seat member 47 and the valve disc member 50 modulates the flow of fuel to the main burner 6 directly and continuously in response to condition responsive means hereinafter described. A plurality of circumferentially spaced ports 100 (there being four of these ports in one illustrative embodiment of the invention) pass the modulated flow of fuel for the main burner 6 from the passage 45 into the interior of the valve seat member 47.

The chamber 48 opens at 51 (Figure 3) into a conical bore 52 which bore 52 opens at 53 to the outlet 3 which leads to the main burner 6. A truncated conical gas cock or plug 54 seated in the bore 52 has a passage 55 opening diametrically therethrough which by turning of the plug may be turned into or out of register with the passages 51 and 53 to turn on or shut off the supply of fuel to the main burner 6, including that flow under the control of the condition responsive modulating control valve aforedescribed and the flow from a by-pass hereinafter described provided to insure minimum flow of fuel to the main burner consistent with maintenance of a stable and safe flame.

A coiled spring 58 disposed within the tubular part of the valve seat member 47 and acting endwise between a shoulder 59 in the valve seat member 47 and the valve disc member 50 is effective to bias the valve disc member 50 to flow permitting position separated from the valve seat member. A guide pin 60 carried by the valve seat member 47 extends through the convolutions of the spring 58.

The valve body 1 has an attachment flange or plate 62 for attachment at 63 to the wall of the brooder or other receptacle or enclosure with the valve body 1 outside the enclosure. The valve seat member 47 has a reduced diameter part which fits in a reduced bore 64 at the outer end of the bore 46. An O-shaped sealing ring 65 disposed in an annular groove in the reduced diameter part of the member 47 has sealing engagement against the reduced bore 64. Outwardly beyond the ring 65 the valve seat member 47 has a stem 66 screwed at 67 through the outer side of the valve body 1. Fixed on the outer projecting end of the stem 66 for access from the outside of the receptacle or enclosure 7 is a fingerpiece or knob 68. By grasping the knob 68, the valve seat member 47 may be screwed in an inward or outward direction to adjust the temperature or condition setting of the device.

A sealing adapter 70 is screwed at 71 into the inner side of the valve body 1 in axial alignment with the valve seat member 47 and projects into the brooder or other receptacle when the control device is applied to the wall thereof. A nipple 72 providing support for the temperature or condition responsive means is screwed at 73 into the adapter 70.

The condition responsive means selected for illustration comprises a hermetically sealed bellows structure 75 containing a volatile fill and expansible and contractible in response to changes in temperature within the brooder or other receptacle 7. The bellows 75 is carried by a retainer plate 76 with a washer 76' therebetween. A bellows retainer comprises a pair of diametrically oppositely disposed inverted U-shaped retainer straps 77 and 78. The crossing bases of these straps have registering openings passing over the nipple 72 and the straps are secured in place on the nipple between nuts 79 screwed on the nipple. The free ends of the legs of the straps 77 and 78 have inturned lugs 80. The retainer plate 76 has peripheral notches, one of which is shown in dotted lines at 81' in Figure 4, which when registered with the lugs 80 permit inserting the retainer plate and bellows assembly into the retainer or removal therefrom—the lugs 80 passing through these notches at such time. By turning the retainer plate and bellows assembly or at least the retainer plate after insertion into the retainer to move the notches out of register with the lugs 80, the bellows and retainer plate are mounted by means of the quick detachable connection thus afforded between the retainer and the retainer plate.

With the bellows thus assembled, there is a pin 81 slidable in the nipple 72 which cooperates at its inner end with the adjacent end of the bellows 75 and at its outer end with a valve pin 84. The outer end of the pin 84 cooperates with the valve disc member 50 so that when the bellows 75 expands upon a rise in temperature, it moves the valve disc member 50 toward fuel flow preventing position seating against the adjacent end of the valve seat member 47 against the bias of the spring 58.

When the bellows 75 contracts upon a drop in temperature, the spring 58 separates the valve disc member 50 from the valve seat member 47 for modulation of the flow of fuel to the main burner through the outlet 3 when the gas cock 54 is open.

The pin 81 has a groove 86 intermediate its ends and a lock pin 87 engages in this grooved portion of the pin 81 to lock this pin against complete displacement from the nipple 72. A guide bushing 88 for the valve pin 84 is provided in the adapter 70 and a retainer may be provided at 89. O-shaped sealing rings may be provided at 90 for sealing cooperation with the valve pin 84.

In order to provide a minimum safe flow of fuel to the main burner when the valve seat member 47 and valve disc member 50 are in flow preventing relation, a by-pass passage 95 opens laterally from the bore 46 (Figures 1 and 5) and through a passage 96 into the chamber 48 from where it flows through the gas cock 54 (when open) to the outlet 3 and from there to the main burner 6. The gas cock 54 thus controls not only the modulated flow of fuel passed between the valve seat member 47 and its cooperating valve disc member 50 when the valve disc member is separated from the valve seat member, but also controls the minimum safe flow of fuel to the main burner by way of the by-pass passage 95.

A by-pass adjusting screw 98 is screwed into the by-pass passage 95 for adjusting the by-pass flow of fuel and thereby the minimum safe flow to the main burner 6. The outer end of this screw 98 has a kerf or is otherwise formed for engagement by a screwdriver or other suitable implement for adjusting the by-pass screw. Outwardly of the screw 98 the passage 95 is closed by a sealing plug 99 which is screwed into the passage 95. The outer end of the sealing plug 99 also has a kerf 110 or is otherwise formed for engagement by a screwdriver or other suitable tool and may be marked "By Pass" as shown in Figure 2.

As also shown in Figure 2, the ignition burner valve 40 or its knob 41 may have a radially extending arm 102 provided with an arcuate slot 103. A screw 104 having a threaded shank passing through the slot 103 and screwed, for example, into the valve body 1 is adapted for locking the ignition burner valve 40 in "on" or "off" position, and, if desired, in any intermediate position. The arm 102 may be marked "Off" and "On" as shown in Figure 2, and the knob 41 may be marked "Pilot Valve" as shown in Figure 2.

The aforedescribed pilot flow regulating valve when turned to off position provides means for manually shutting down the entire control, since when the pilot or ignition burner is extinguished the thermocouple 19 is no longer heated and the shut-off valve 16 is deenergized for movement to closed position for 100 percent shut-off. Moreover, since the gas cock 54 is, as aforementioned, downstream and provides means for shutting off flow of fuel to the main burner, the pilot burner only may be utilized in very mild weather to provide heat to the brooder of lesser magnitude than that provided by the by-pass 95 to the main burner. The pilot line valve 40 in this circumstance provides for adjustment of the amount of fuel flowing to the pilot burner for manual temperature control to regulate the heat inside the brooder or other space heated.

The gas cock 54 is provided with a radially extending handle 106 for turning the same. A spring 107 (Figures 2 and 4) maintain the gas cock 54 yieldingly seated against its conical bore 52. Stops 108 (Figures 2 and 4) cooperate with the handle 106 to limit turning movement of the gas cock 54 in one direction to full open position and in the other direction to full closed position.

The operation of the aforedescribed embodiment of the invention is as follows:

Gas enters at 2 and with the button 30 manually pressed inwardly to hold the safety shut-off valve 16 open and the armature 21 in attracted position, the gas passes through passageways 35 and 37 (assuming that the ignition burner valve 40 is open) and thence through the ignition burner fuel outlet 38 and the ignition burner fuel supply pipe 9 to the ignition burner 8 where it is ignited. The flow interrupter valve 31 interrupts the flow of fuel for the main burner as long as the button 30 is pressed inwardly. Upon energization of the electromagnetic means 18 by the heat of the ignition burner flame on the thermocouple 19, the armature 21 is held attracted to the electromagnet with the valve member 16 in open position and the button 30 may be released. Upon release of the button 30, the flow interrupter valve 31 opens so that gas will enter the interior of the valve seat member 47 through the passage 45 and the ports 100.

With the gas cock 54 in open position, gas will also flow through the by-pass passages 95 and 96 and thence through the chamber 48, gas cock 54 and fuel supply pipe 4 to the main burner 6 where it is ignited, for example, by the ignition burner 8 to maintain a minimum safe main burner flame as determined by the by-pass adjustment screw 98.

When the temperature, for example, of the air or other medium within the brooder or other receptacle or otherwise surrounding the bellows 75 begins to fall below that set, for example, by the temperature adjustment knob 68, the bellows 75 contracts and the spring 78 moves the valve disc member 50 away from closed position to a modulating position separated from the adjacent open end of the valve seat member 47. A modulated flow of gas then passes between the lower open end of the valve seat member 47 and the valve disc member 50 into the chamber 48 and thence through the gas cock 54 and the fuel supply pipe 4 to the main burner 6 to provide a somewhat higher flame at the main burner. The valve disc member 50 has movement with expansion and contraction of the bellows 75 in accordance with variations in temperature and modulates the flow of fuel to the main burner 6 in accordance with variations in temperature.

Upon rise in temperature above that set by the knob 68, the bellows 75 expands and moves the valve disc member 50 to position seating against and closing the open end of the valve seat member 47. This shuts off the modulated flow of fuel to the main burner 6 but the minimum safe flow of fuel may continue through the by-pass passages 35 and 37 to maintain such flame at the main burner 6.

If at any time the flame of the ignition burner 8, which normally should burn constantly, becomes extinguished, thereby creating an unsafe condition, the thermocouple 19 will be deenergized and the flow of energizing thermoelectric current in the electromagnetic means 18 will be discontinued. When this occurs, the safety shut-off valve 16 moves to closed position, thereby shutting off the flow of fuel to both the main burner and to the ignition burner to provide 100 percent shut-off of the fuel.

The temperature setting of the thermostat is achieved by turning the knob 68 to screw the valve seat member 47 in inward or outward direction as desired for temperature adjustment.

It will be noted from the drawings and the foregoing description that the safety shut-off valve 16 is in the path of the fuel flow upstream not only of the flow controlling cooperation between the valve seat member 47 and the valve disc member 50 but also upstream of the ignition burner fuel supply passages 35 and 37 and upstream of the minimum flame by-pass passages 95 and 96 to provide the desired 100 percent safety shut-off of all fuel when the flame of the ignition burner 8 is extinguished. The gas cock 54 is downstream of the chamber 48 and therefor downstream of both the modulated and minimum flame flows of fuel for the main burner 6.

The novel relation and coaction of the parts permits disposition of the bellows 75 within the brooder or other receptacle 7 with the temperature adjusting knob 68, as well as the button 30, gas cock 54 and its handle 106, and ignition burner valve knob 40, all outside the brooder or other receptacle with the advantages previously set forth.

The embodiment of the invention shown in the drawings is for illustrative purposes only and it is to be expressly understood that said drawings and the accompanying specification are not to be construed as a definition of the limits or scope of the invention, reference being had to the appended claims for that purpose.

We claim:

1. A highly sensitive thermostatically operated gaseous fuel control valve for controlling the supply of gaseous fuel to the gaseous fuel burning heater of a fowl brooder or the like having means comprising an apertured wall defining an enclosure in which the air temperature is to be controlled within a predetermined limited range above the temperature of the environment external to said enclosure, said control valve comprising a control body for disposition substantially entirely externally of said enclosure wall, a valve seat within said valve body, a valve member within said control body cooperable with and movable toward and away from said valve seat, tubular guide and support means carried by said control body and having a portion for extension through said wall aperture into said enclosure, retainer means on the extended end of said guide and support means comprising a plurality of arms having spaced end portions, a retainer plate, and means affording a quick detachable connection of the periphery of said plate to said arm end portions supporting said plate in a plane substantially normal to the axis of said tubular guide and support means, force transmitting means comprising a small diameter valve pin within said tubular guide and support means, said pin having one end sealingly and slidably extending into said control body with a low friction fit and into engagement with said valve member, and a larger diameter pin having a loose axial sliding fit within said guide and support means, said larger pin having one end projecting from said guide and support means and the other end engageable with said valve pin, cooperating shoulder means on said larger pin and said guide and support means preventing removal of said larger pin from said guide and support means, and an hermetically sealed expansible and contractible thermostatic bellows element having a volatile fluid fill disposed intermediate said spaced arm end portions and having one end wall abutting the exposed end of said larger diameter pin, said element also having an opposite end wall abutting said retainer plate, the abutting connections of said thermostatic element with said larger pin and retainer plate permitting ready removal of said element from said retainer means and said force transmitting means on release of said quick detachable connection of said retainer plate and said arm end portions, and said shoulder means preventing disassembly of said force transmitting connection during such removal.

2. A highly sensitive thermostatically operated gaseous fuel control valve for controlling the supply of gaseous fuel to the gaseous fuel burning heater of a fowl brooder or the like having means comprising an apertured wall defining an enclosure in which the air temperature is to be controlled within a predetermined limited range above the temperature of the environment external to said enclosure, said control valve comprising a control body for disposition substantially entirely externally of said enclosure wall, a valve seat within said valve body, a valve member within said control body cooperable with and movable toward and away from said valve seat, tubular guide and support means carried by said control body and having a portion for extension through said wall aperture into said enclosure, retainer means on the extended end of said guide and support means comprising a plurality of arms having spaced end portions formed with inturned lugs, a retainer plate normally disposed intermediate said arms in a plane substantially normal to the axis of said tubular guide and support means and having outer surface portions peripherally overlapped and engaged by said arm lugs, said plate being formed with peripheral notches movable into registry with said arm lugs on rotation of said plate to permit quick removal of the latter, force transmitting means comprising a small diameter valve pin within said tubular guide and support means, said pin having one end sealingly and slidably extending into said control body with a low friction fit and into engagement with said valve member, and a larger diameter pin having a loose axial sliding fit within said guide and support means, said larger pin having one end projecting from said guide and support means and the other end engageable with said valve pin, cooperating shoulder means on said larger pin and said guide and support means preventing removal of said larger pin from said guide and support means, and an hermetically sealed expansible and contractible thermostatic bellows element having a volatile fluid fill disposed intermediate said spaced arm end portions and having one end wall abutting the exposed end of said larger diameter stem, said element also having an opposite end wall abutting said retainer plate, the abutting connection of said thermostatic element with said larger stem and said retainer plate permitting ready removal of said element from said retainer means on removal of said retainer plate, and said shoulder means preventing disassembly of said force transmitting connection during such removal.

References Cited in the file of this patent

UNITED STATES PATENTS

| | | |
|---|---|---|
| 1,058,171 | Froehlich | Apr. 8, 1913 |
| 1,120,707 | Froehlich | Dec. 15, 1914 |
| 1,179,519 | Gold | Apr. 18, 1916 |
| 1,567,081 | Robertshaw | Dec. 29, 1925 |
| 1,569,312 | Bohnhart | Jan. 12, 1926 |
| 1,794,610 | Halsey | Mar. 3, 1931 |
| 1,936,324 | Carson | Nov. 21, 1933 |
| 1,999,732 | Leins | Apr. 30, 1935 |
| 2,141,614 | Mott | Dec. 27, 1938 |
| 2,198,896 | Wetzel | Apr. 30, 1940 |
| 2,547,800 | West | Apr. 3, 1951 |
| 2,557,927 | Abrams | June 26, 1951 |
| 2,578,718 | Mayer | Dec. 18, 1951 |
| 2,673,688 | Busser | Mar. 30, 1954 |

FOREIGN PATENTS

| | | |
|---|---|---|
| 251,875 | Great Britain | May 13, 1926 |